(12) United States Patent
Okamura

(10) Patent No.: US 9,619,067 B2
(45) Date of Patent: Apr. 11, 2017

(54) SEMICONDUCTOR DEVICE

(71) Applicant: Synaptics Japan GK, Tokyo (JP)

(72) Inventor: Kazuhiro Okamura, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 49 days.

(21) Appl. No.: 14/638,859

(22) Filed: Mar. 4, 2015

(65) Prior Publication Data

US 2015/0268778 A1 Sep. 24, 2015

(30) Foreign Application Priority Data

Mar. 18, 2014 (JP) .................................. 2014-054268

(51) Int. Cl.
*G06F 3/041* (2006.01)
*G06F 3/042* (2006.01)
*G06F 3/043* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04104* (2013.01); *G09G 2320/0219* (2013.01)

(58) Field of Classification Search
CPC ...... G06F 3/041; G06F 3/0412; G06F 3/0416; G06F 3/042; G06F 3/044; G09G 2320/0209; G09G 2320/0219
See application file for complete search history.

(56) References Cited

U.S. PATENT DOCUMENTS

| 8,766,950 B1* | 7/2014 | Morein | G06F 3/044 345/173 |
|---|---|---|---|
| 2008/0055260 A1* | 3/2008 | Posamentier | G06F 3/041 345/173 |
| 2008/0062148 A1* | 3/2008 | Hotelling | G02F 1/13338 345/174 |
| 2010/0328239 A1* | 12/2010 | Harada | G06F 3/0412 345/173 |
| 2011/0128254 A1* | 6/2011 | Teranishi | G06F 3/0412 345/174 |
| 2011/0242020 A1* | 10/2011 | Kang | G06F 3/044 345/173 |
| 2012/0050147 A1* | 3/2012 | Iwasa | G09G 3/3614 345/96 |
| 2012/0086661 A1* | 4/2012 | Shi | G06F 3/041 345/173 |
| 2012/0105337 A1* | 5/2012 | Jun | G06F 3/0412 345/173 |
| 2012/0242615 A1* | 9/2012 | Teraguchi | G06F 3/0412 345/174 |

(Continued)

FOREIGN PATENT DOCUMENTS

JP 2012-234475 A 11/2012

*Primary Examiner* — Michael J Eurice
(74) *Attorney, Agent, or Firm* — Patterson + Sheridan, LLP

(57) ABSTRACT

A display signal drive circuit is configured to output a display signal having a signal level based on a common voltage to a display panel. A touch detection signal drive circuit is configured to output a touch detection signal having a signal level based on the common voltage to a touch panel in case that a composite panel is an in-cell type, and is configured to output a touch detection signal having a signal level based on a voltage level other than the common voltage to the touch panel in case that the composite panel is an on-cell type.

12 Claims, 11 Drawing Sheets

(56) References Cited

U.S. PATENT DOCUMENTS

| | | | | |
|---|---|---|---|---|
| 2012/0274603 A1* | 11/2012 | Kim | G06F 3/0412 | 345/174 |
| 2013/0050130 A1* | 2/2013 | Brown | G06F 3/044 | 345/174 |
| 2013/0181946 A1* | 7/2013 | Lee | G06F 3/044 | 345/174 |
| 2013/0265256 A1* | 10/2013 | Nathan | G06F 3/0414 | 345/173 |
| 2013/0314343 A1 | 11/2013 | Cho et al. | | |
| 2013/0314371 A1* | 11/2013 | Lee | G06F 3/0412 | 345/174 |
| 2013/0328829 A1* | 12/2013 | Lee | G06F 3/0412 | 345/174 |
| 2013/0335342 A1* | 12/2013 | Kim | G06F 3/044 | 345/173 |
| 2013/0335367 A1* | 12/2013 | Kim | G09G 3/3696 | 345/174 |
| 2013/0335943 A1* | 12/2013 | Shibazaki | G02B 5/0278 | 362/19 |
| 2014/0028626 A1* | 1/2014 | Maeda | G06F 3/0416 | 345/174 |
| 2014/0078420 A1* | 3/2014 | Liu | G06F 3/0412 | 349/12 |
| 2014/0111476 A1* | 4/2014 | You | G09G 3/3655 | 345/174 |
| 2014/0118642 A1* | 5/2014 | Wang | G02F 1/13338 | 349/12 |
| 2014/0192019 A1* | 7/2014 | Fukushima | G06F 3/0412 | 345/174 |
| 2014/0218639 A1* | 8/2014 | Lin | G02F 1/13338 | 349/12 |
| 2014/0240176 A1* | 8/2014 | Tolbert | H01Q 1/243 | 343/702 |
| 2014/0247402 A1* | 9/2014 | Chou | G02F 1/13338 | 349/12 |
| 2014/0253498 A1* | 9/2014 | Suzuki | G06F 3/044 | 345/174 |
| 2014/0333582 A1* | 11/2014 | Huo | G02F 1/13338 | 349/12 |
| 2014/0362028 A1* | 12/2014 | Mo | G06F 3/044 | 345/174 |
| 2014/0375907 A1* | 12/2014 | Wu | G06F 3/0412 | 349/12 |
| 2015/0022501 A1* | 1/2015 | Kita | G02F 1/13338 | 345/174 |
| 2015/0041786 A1* | 2/2015 | Li | H01Q 1/44 | 257/40 |
| 2015/0049047 A1* | 2/2015 | Liao | G06F 3/044 | 345/174 |
| 2015/0061985 A1* | 3/2015 | Sugiyama | G09G 3/3677 | 345/87 |
| 2015/0103032 A1* | 4/2015 | Bell | G06F 3/044 | 345/174 |
| 2015/0103267 A1* | 4/2015 | Zhang | H05F 1/00 | 349/12 |
| 2015/0199038 A1* | 7/2015 | Li | G06F 3/041 | 345/173 |
| 2015/0355762 A1* | 12/2015 | Tripathi | G06T 1/20 | 345/173 |
| 2015/0378486 A1* | 12/2015 | Yu | G06F 3/0412 | 345/174 |
| 2016/0026290 A1* | 1/2016 | Liu | G06F 3/0412 | 345/174 |

\* cited by examiner

SEMICONDUCTOR DEVICE

CROSS-REFERENCE TO RELATED APPLICATIONS

The Present application claims priority from Japanese application JP 2014-054268 filed on Mar. 18, 2014, the content of which is hereby incorporated by reference into this application.

BACKGROUND

The invention relates to a semiconductor device, and particularly relates to a technique capable of being suitably used in a semiconductor device (e.g., IC: integrated circuit), having a display driver and a touch panel controller integrated into the same chip, which is capable of being connected to a composite panel in which a touch sensor and a display panel are superimposedly mounted.

Hitherto, on-cell types in which a display panel and a touch panel are independent of each other have been the mainstream. However, in recent years, in-cell types capable of achieving a further reduction in thickness in which a display panel and a touch panel are integrated with each other have become widespread, particularly, in mobile panel modules.

In an in-cell type, a display driver and a touch panel controller are connected to a display panel including a touch sensor, and image data which is input from a host processor is displayed, and a touched position is detected and is output to the host processor. JP-A-2013-246434 discloses a display device having a touch sensor and a method of driving the same that are capable of reducing an influence of noise by performing time division on a region for touch sensing and display and alternately driving the region, in a display and touch panel of an in-cell type. JP-A-2012-234475 discloses an electrode drive circuit for touch sensing of a touch sensor panel. In a driving circuit that outputs a signal for detection to a touch sensor, a switch circuit that selects a necessary driving voltage from a plurality of driving voltages is included in order to mitigate the influence of noise caused by the rise and fall of the signal, and switching control of the switch circuit is performed depending on waveform modes.

SUMMARY

A semiconductor device configured for connection to a composite panel having a display panel and a touch panel laminated therein is described. In an embodiment, the semiconductor device includes a display signal drive circuit and a touch detection signal drive circuit. The display signal drive circuit is configured to output a display signal having a signal level based on a common voltage to the display panel. The touch detection signal drive circuit is configured to output a touch detection signal having a signal level based on the common voltage to the touch panel in case that the composite panel is an in-cell type, and configured to output a touch detection signal having a signal level based on a voltage level other than the common voltage to the touch panel in case that the composite panel is an on-cell type.

DETAILED DESCRIPTION

Figure 1:
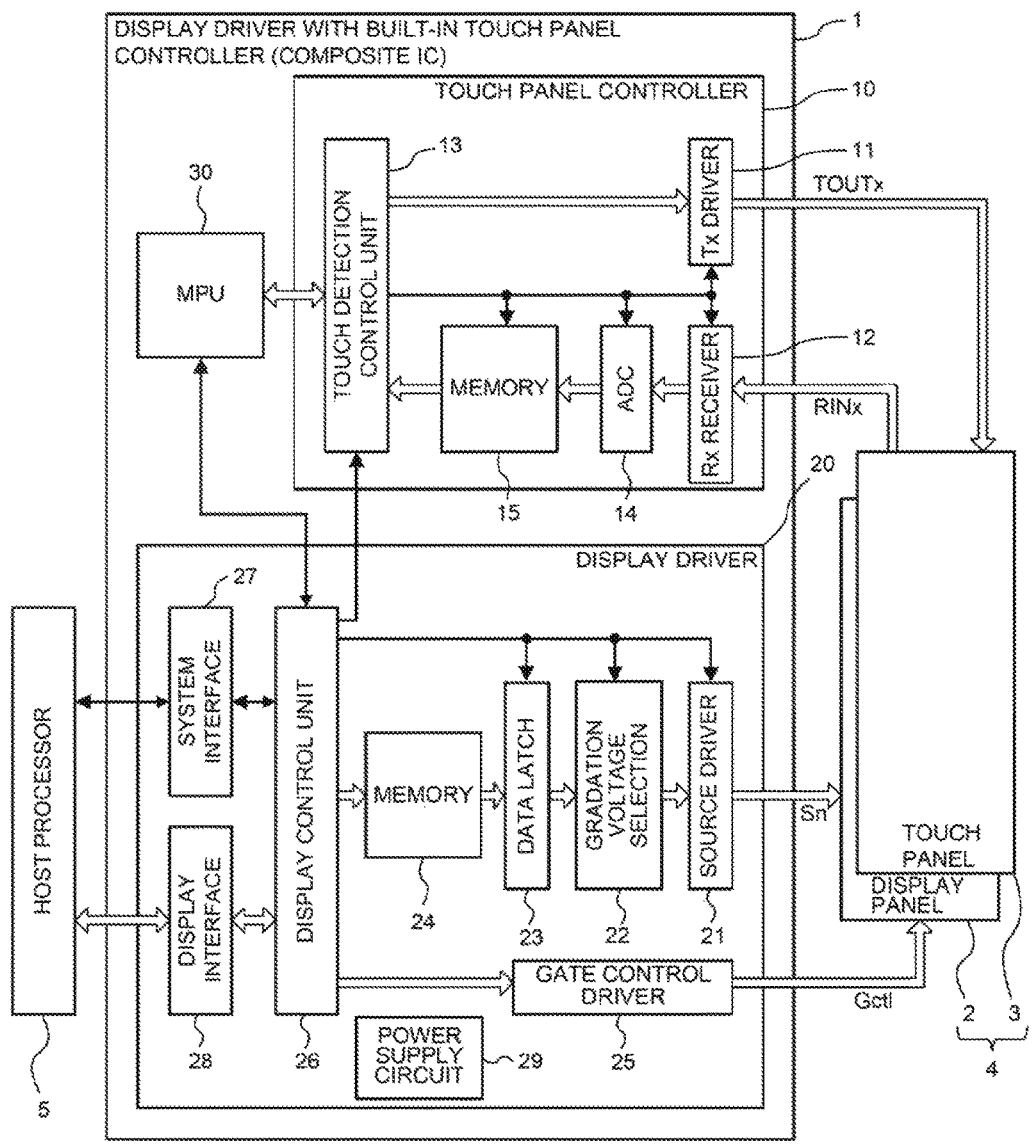
FIG. 1 is a block diagram illustrating an example of a display driver with a built-in touch panel controller (composite IC) according to embodiments of the invention.

In a display and touch panel device of an in-cell type, as disclosed in, for example, JP-A-2013-246434, the display and touch panel are provided with a common wiring CL, and a common voltage (Vcom) is supplied from a common voltage generation unit. On the other hand, in a display and touch panel device of an on-cell type, an electrode for touch detection is included separately from an electrode for display. For example, JP-A-2012-234475 discloses a touch panel controller, connected to a touch panel having a plurality of intersection capacitances formed therein by a plurality of Y electrodes and a plurality of X electrodes that intersect each other, which applies a drive pulse to the Y electrodes, and detects the transfer of charge appearing in the X electrodes in association therewith. In JP-A-2012-234475, it does not matter whether the touch panel is an in-cell type or an on-cell type. Therefore, in the case of application to the display and touch panel device of an in-cell type, the drive pulse that is applied to the Y electrodes is applied on the basis of the common voltage (Vcom).

Here, in the semiconductor device (IC) having a display driver and a touch panel controller integrated into the same chip, the common voltage (Vcom) serving as a reference potential of a power supply that drives an electrode for display is also used as a reference potential of a drive circuit that outputs a signal for detection to the touch sensor. This is because, in a case that such an IC is applied to the display and touch panel device of an in-cell type, as described above, it is necessary to supply the common voltage (Vcom) commonly to a common wiring.

In case that the same IC is configured to be capable of being applied to the display and touch panel device of either an in-cell type or an on-cell type, it has been found that there is the following problem. That is, in case that the same touch detection signal drive circuit is used regardless of whether a panel to be connected is an in-cell type or an on-cell type, the routing of a wiring for supplying the common voltage (Vcom) varies greatly in both types. Therefore, it has been found that there may be a concern of a deterioration in image quality being caused due to a tendency to receive exogenous noise in the case of the on-cell type. This is because the common voltage (Vcom) is wired in common for display and touch detection in the case of connection to the display and touch panel of an in-cell type, whereas a wiring to the touch panel is required separately from a wiring to the display panel in the case of connection to the display and touch panel of an on-cell type.

Embodiments of the invention described herein prevent exogenous noise from being mixed into a common voltage (Vcom) even in a case of connection to a display and touch panel of an on-cell type, in a semiconductor device (IC), having a display driver and a touch panel controller integrated into the same chip, which is capable of being applied to a display and touch panel device of either an in-cell type or an on-cell type.

Techniques for solving such a problem will be described below, but other problems and novel features will be apparent from the following description and accompanying drawings of the specification.

According to an embodiment, the following configuration is formed. That is, a semiconductor device, including a display signal drive circuit and a touch detection signal drive circuit, which is capable of being connected to a composite panel having a display panel and a touch panel laminated therein, is configured as follows. The display signal drive circuit outputs a display signal having a signal level based on the common voltage (Vcom) to the display panel. The touch detection signal drive circuit outputs a touch detection signal having a signal level based on the common voltage (Vcom) to the touch panel in case that the composite panel is an in-cell type, and outputs a touch detection signal having a signal level based on a voltage level other than the common voltage (Vcom) to the touch panel in case that the composite panel is an on-cell type.

A brief description of an effect obtained by the embodiment is as follows. That is, in a semiconductor device (IC), having a display driver and a touch panel controller integrated into the same chip, which is capable of being applied to the display and touch panel device of either the in-cell type or the on-cell type, even in the case of connection to the display and touch panel (composite panel) of the on-cell type, it is possible to prevent exogenous noise from being mixed into the common voltage (Vcom). This is because the routing of the common voltage (Vcom) in the case of connection to the composite panel of the on-cell type does not become remarkably longer than in the case of connection to the composite panel of the in-cell type.

1. Summary of the Embodiments

First, summary of representative embodiments of the invention disclosed in the application will be described. Reference numerals in drawings in parentheses referred to in description of the summary of the representative embodiments denote components included in the concept of the components to which the reference numerals are designated.

[1] Touch Detection Signal Drive Circuit that Switches TxL in In-Cell/On-Cell

A semiconductor device (1) according to a representative embodiment disclosed in the present application is a semiconductor device, including a display signal drive circuit (source driver 21) and a touch detection signal drive circuit (Tx driver 11), which is capable of being connected to a composite panel (4) having a display panel (2) and a touch panel (3) laminated therein, and is configured as follows.

The display signal drive circuit outputs a display signal (Sn) having a signal level based on a common voltage (Vcom) to the display panel.

The touch detection signal drive circuit outputs a touch detection signal (TOUTx) having a signal level based on the common voltage (Vcom) to the touch panel in case that the composite panel is an in-cell type, and outputs a touch detection signal (TOUTx) having a signal level based on a voltage level other than the common voltage (Vcom) to the touch panel in case that the composite panel is an on-cell type.

Thereby, in a semiconductor device (IC), having a display driver and a touch panel controller integrated into the same chip, which is capable of being applied to the display and touch panel device of either the in-cell type or the on-cell type, even in the case of connection to the display and touch panel (composite panel) of the on-cell type, it is possible to prevent exogenous noise from being mixed into the common voltage (Vcom). This is because the routing of the common voltage (Vcom) in the case of connection to the composite panel of the on-cell type does not become remarkably longer than in the case of connection to the composite panel of the in-cell type.

[2] Power Supply Circuit

In item [1], the semiconductor device (1) further includes a power supply circuit (29) that generates a power supply for supplying the common voltage (Vcom) and a power supply having the voltage level other than the common voltage (Vcom), on the basis of an external power supply (VSP) on the positive electrode side and an external power supply (VSN) on the negative electrode side which are supplied external to the semiconductor device (1).

Thereby, required power supplies are generated inside the semiconductor device (IC).

[3] TXL=VCL

In item [2], the power supply circuit generates an internal reference power supply (VCL) on the negative electrode side, and supplies the generated power supply to the touch detection signal drive circuit, as the power supply having the voltage level other than the common voltage (Vcom).

Thereby, in case that the composite panel (4) is an on-cell type, the internal reference power supply (VCL) on the negative electrode side is used instead of the common voltage (Vcom). Generally, since VCL has substantially the same voltage level as that of Vcom, it is possible to eliminate the need for switching control such as, for example, withstanding voltage switching for enabling other circuits within the touch panel controller (10) to be applied to both the in-cell type and the on-cell type.

[4] TXL=VSN

In item [2], the external power supply (VSN) on the negative electrode side is supplied to the touch detection signal drive circuit, as the power supply having the voltage level other than the common voltage (Vcom).

Thereby, in case that the composite panel (4) is an on-cell type, the external power supply (VSN) on the negative electrode side is used instead of the common voltage (Vcom). By not going through the internal power supply circuit (29), it is possible to reduce a path in which exogenous noise that is mixed into the touch detection signal (TOUTx) is mixed into a circuit on the display driver (20) side through the power supply.

[5] TXL=VGSS

In item [2], a gate control driver (25) that drives a gate control circuit (81_1, 81_2) of the display panel is further included, and the power supply circuit generates gate drive power supplies (GVDD, GVSS) on the positive electrode side and the negative electrode side to supply the generated power supplies to the gate control driver, and supplies the gate drive power supply (GVSS) on the negative electrode side to the touch detection signal drive circuit, as the power supply having the voltage level other than the common voltage (Vcom).

Thereby, in case that the composite panel (4) is an on-cell type, a gate drive power supply (VGSS) that drives the gate control circuits (80_1, 80_2) of the display panel (2) is used instead of the common voltage (Vcom). Generally, VGSS is set to approximately −11 V, and is stabilized and generated after an external power supply is once boosted by the power supply circuit (29), and thus has little influence on noise. In addition, the touch detection signal (TOUTx) preferably has a large amplitude in order to improve the sensitivity of touch detection. However, in the case of the in-cell type, a withstanding voltage is restricted on the structure, and is generally less than 10 V in many cases. Therefore, the touch detection signal (TOUTx) is appropriately suppressed to an amplitude that does not exceed the above withstanding voltage as a Vcom reference. On the other hand, in the case of the on-cell type, the withstanding voltage is generally equal to or greater than 15 V, and thus it is not necessary to keep the amplitude of the touch detection signal (TOUTx) small in accordance with the in-cell type. With such a configuration as in "item [5]", the amplitude of the touch detection signal (TOUTx) can be appropriately switched on the basis of whether the composite panel (4) to be connected is an in-cell type or an on-cell type.

[6] TXL=VGL

In item [2], a gate control driver (25) that drives gate control circuits (80_1, 80_2) of the display panel is further included.

The power supply circuit includes a booster circuit that boosts each of the external power supplies on the positive electrode side and the negative electrode side, and a stabilizing circuit that stabilizes an output of the booster circuit, and generates gate drive power supplies (GVDD, GVSS) on the positive electrode side and the negative electrode side using the booster circuit and the stabilizing circuit to supply the generated power supplies to the gate control driver.

The power supply circuit supplies an output power supply (VGL) of the booster circuit on the negative electrode side to the touch detection signal drive circuit, as the power supply having the voltage level other than the common voltage (Vcom).

Thereby, in case that the composite panel (4) is an on-cell type, the boosting power supply (VGL) that is internally boosted in order to generate a gate drive power supply (VGSS) that drives the gate control circuits (80_1, 80_2) of the display panel (2) is used instead of the common voltage (Vcom). As is the case with "item [5]", it is possible to appropriately switch the amplitude of the touch detection signal (TOUTx) on the basis of whether the composite panel (4) to be connected is an in-cell type or an on-cell type, and to make the amplitude of the touch detection signal (TOUTx) in the case of the on-cell type larger than in the case of "item [5]".

[7] Selection from Various Internal Power Supplies Generated by Power Supply Circuit In item [1], the semiconductor device (1) further includes a power supply circuit (29) that generates various internal power supplies including a power supply for supplying the common voltage, on the basis of an external power supply (VSP, VSN) that is supplied from an outside.

In case that the composite panel is an on-cell type, the touch detection signal drive circuit selects one power supply from the external power supply and the various internal power supplies that are generated from the power supply circuit, as the voltage level other than the common voltage (Vcom), and outputs a touch detection signal (TOUTx) having a signal level based on the selected power supply to the touch panel.

Thereby, a required power supply is generated inside the semiconductor device (IC), and thus it is possible to select an appropriate voltage in accordance with the characteristics of the composite panel (4) to be connected.

[8] Various Internal Power Supplies=VCL/VSN/GVSS/VGL

In item [7], the semiconductor device further includes a gate control driver (25) that drives a gate control circuit of the display panel.

The power supply circuit generates various internal power supplies including a power supply for supplying the common voltage (Vcom), on the basis of an external power supply (VSP) on the positive electrode side and an external power supply (VSN) on the negative electrode side that are supplied from the outside.

The power supply circuit includes a booster circuit that boosts each of the external power supplies on the positive electrode side and the negative electrode side, and a stabilizing circuit that stabilizes an output of the booster circuit, and generates gate drive power supplies (GVDD, GVSS) on the positive electrode side and the negative electrode side using the booster circuit and the stabilizing circuit to supply the generated power supplies to the gate control driver.

The various internal power supplies include an internal reference power supply (VCL) on the negative electrode side, an output (VGL) of the booster circuit, and the gate drive power supply (GVSS).

Thereby, a power supply required for the touch detection signal drive circuit (11) can be selected from various internal power supplies that are generated inside the semiconductor device (IC).

[9] Voltage Variable Power Supply for Touch Detection Signal Drive Circuit

In item [1], the semiconductor device (1) further includes a variable power supply circuit (31) that makes a generated voltage variable.

In case that the composite panel is an on-cell type, the touch detection signal drive circuit outputs a touch detection signal (TOUTx) having a signal level based on a voltage generated by the variable power supply circuit, to the touch panel, as the voltage level other than the common voltage (Vcom).

Thereby, it is possible to freely determine the amplitude level on the low voltage side of the touch detection signal (TOUTx) in the case of the on-cell type.

[10] Setting Terminal

In item [1], the semiconductor device (1) further includes a terminal for specifying whether the composite panel (4) to be connected is an in-cell type or an on-cell type.

Thereby, it is possible to easily set whether the composite panel to be connected is an in-cell type or an on-cell type.

[11] Setting Register

In item [1], a system interface (27) for connection to a host processor (5) and a register for specifying whether the composite panel to be connected is an in-cell type or an on-cell type are further included, and the register is writably configured by the host processor through the system interface.

Thereby, is the external host processor (5) can easily set whether the composite panel (4) to be connected is an in-cell type or an on-cell type.

[12] Initial Value of Setting Register is "In-Cell Type"

In item [11], an initial value of the register at the time of power-on is set to a value for specifying that the composite panel to be connected is an in-cell type.

Thereby, even in case that the composite panel (4) to be connected is an in-cell type and has a low withstanding voltage, an accident of a touch detection signal having a large amplitude being applied by mistake before register setting can be prevented from occurring.

2. Further Detailed Description of the Embodiments

The embodiments will be described in detail.

[First Embodiment]

Figure 2:
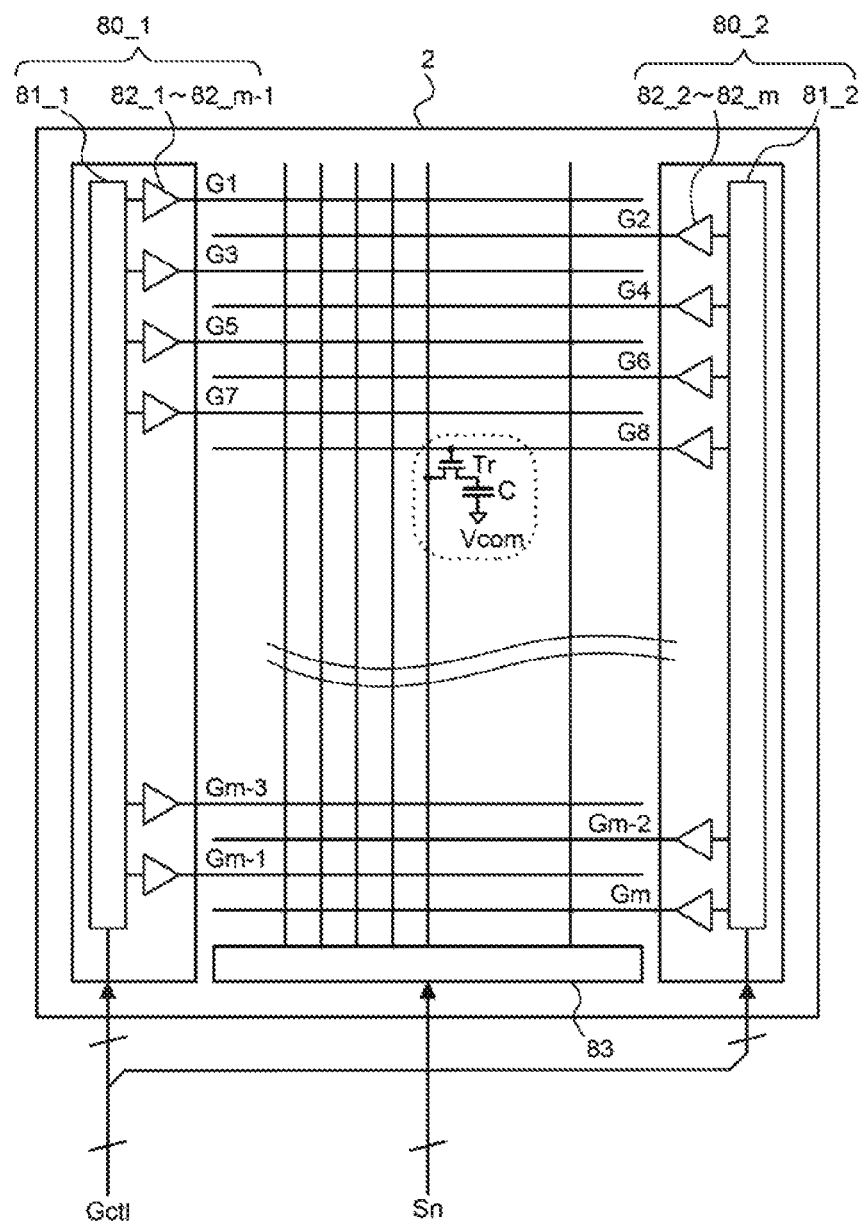
FIG. 2 is a plan view illustrating an embodiment of an electrode configuration of a display panel.

FIG. 1 is a block diagram illustrating a configuration example of a display driver with a built-in touch panel controller (composite IC) according to an embodiment of the invention. FIG. 2 is a plan view illustrating an electrode configuration of a display panel, and FIG. 3 is a plan view illustrating an electrode configuration of a touch panel, according to embodiments of the invention.

A display driver with a built-in touch panel controller (composite IC) 1 is configured to include a touch panel controller 10, a display driver 20, and a MPU 30, and can be connected to a composite panel 4 comprising a display panel 2 and a touch panel 3. The display driver with a built-in touch panel controller (composite IC) 1 is also coupled to a host processor 5. Although not particularly limited, the display driver with a built-in touch panel controller (composite IC) 1 is formed on a single semiconductor substrate such as silicon using, for example, a known CMOS (Complementary Metal-Oxide-Semiconductor) semiconductor manufacturing technique.

The configuration of the display panel 2 is illustrated in FIG. 2. The display panel 2 is configured such that gate wirings G1 to Gm as scanning electrodes formed in a transverse direction and source wirings S1 to Sn as signal electrodes formed in a longitudinal direction are disposed, and that a large number of display cells having selection terminals connected to corresponding scanning electrodes and input terminals connected to corresponding signal electrodes are disposed at the intersection portions thereof. As illustrated in a region that is surrounded by a broken line in the drawing, each of the display cells is constituted by a transfer gate Tr of which the gate terminal is connected to a gate wiring and of which the drain terminal is connected to a source wiring, and a pixel capacitor C that is formed between the source terminal of the transfer gate Tr and the common voltage Vcom. The structures of the transfer gates Tr are symmetric with respect to each other, and the relationship between the drain terminal and the source terminal may be reversed. The gate wirings G1 to Gm that are scanning electrodes are sequentially scanned by gate-in-panel circuits 80_1 and 80_2, which are formed on both sides of the display panel 2. The gate-in-panel circuits 80_1 and 80_2 are configured to include shift registers 81_1 and 81_2 and amplifiers 82_1 to 82_m for driving the respective gate wirings G1 to Gm, respectively. A circuit element constituting the gate-in-panel circuits 80_1 and 80_2 is configured using, for example, thin film transistors (TFT) that are formed on a glass substrate of the display panel 2. A signal Gctl for controlling the gate-in-panel circuits 80_1 and 80_2 is supplied from the display driver 20 within the display driver with a built-in touch panel controller (composite IC) 1. A signal having a voltage level corresponding to luminance to be displayed is applied to the source wirings S1 to Sn as signal electrodes from the display driver 20 within the display driver with a built-in touch panel controller (composite IC) 1 directly or through a demultiplexer 83, and the pixel capacitors C of lines selected by the scanning electrodes are charged in parallel. The configuration of the display panel 2 is arbitrary without being limited to the shown example. For example, instead of including the gate-in-panel circuits, the gate wirings G1 to Gm can also be configured to be directly driven by the display driver 20 within the display driver with a built-in touch panel controller (composite IC) 1.

Figure 3:
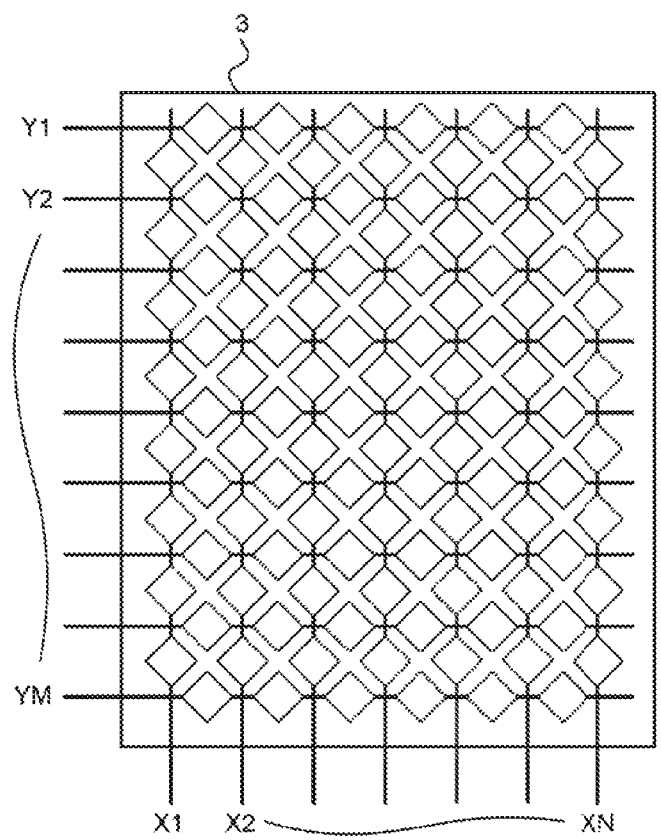
FIG. 3 is a plan view illustrating an embodiment of an electrode configuration of a touch panel.

The electrode configuration of the touch panel 3 is illustrated in FIG. 3. The touch panel 3 is a touch panel of a mutual capacitance type that enables multi-touch detection, and is configured such that a large number of drive electrodes (Y electrodes) Y1 to YM (also denoted as Y electrodes Ym) formed in a transverse direction and a large number of detection electrodes (X electrodes) X1 to XN (also denoted as X electrodes Xn) formed in a longitudinal direction are electrically insulated from each other. Intersection capacitances are formed at the intersecting portions between the X electrodes and the Y electrodes through the capacitance electrode of each electrode. When an object such as a finger comes close to the intersection capacitance, a floating capacitance using the object as a capacitance electrode is added to the intersection capacitance. The Y electrodes Y1 to YM are driven by a touch detection drive signal TOUTx being applied, for example, in the arrangement order, from the touch panel controller 10 within the display driver with a built-in touch panel controller (composite IC) 1. Detection data according to a fluctuation in capacitive component at each intersecting portion is obtained on the basis of signals that are sequentially obtained from the X electrodes X1 to XN, which are detection electrodes in association therewith. The microprocessor (MPU) 30 controls the drive of the touch panel 3, and performs a process of detecting a touch state or coordinates from the detection data that is acquired by the touch panel controller 10. For example, a digital filter arithmetic operation is performed on the detection data, whereby position coordinates at the intersecting portion having a variation in capacitance are arithmetically operated on the basis of de-noised data. In short, position coordinates in case that a contact event is generated are arithmetically operated in order to indicate where the floating capacitance change at an intersecting portion is, that is, where the finger comes close to at the intersecting portion (touch is performed, or a contact event is generated). The touch panel 3 is formed using a transmissive (light-transmitting) electrode or a dielectric film, and is disposed to overlap, for example, the display surface of the display panel 2. In FIG. 3, the touch panel 3 of which the electrode is rhombic in shape is illustrated, but the electrode may have other shapes such as a lattice shape.

Referring back to FIG. 1, a description will be given again. The touch panel 3 and the display panel 2 are superimposedly mounted to form the composite panel 4. The composite panel 4, which is a display and touch panel, is suitable for a collaborative operation such as, for example, the detection of a touch operation of coordinates, corresponding to an icon displayed on the display panel 2, in the laminated touch panel. A method of laminating the composite panel 4 that is a display and touch panel may be carried out as in an in-cell type in which integral mounting is performed, and may be carried out with an integral configuration of cover glass of an on-cell type in which the touch panel 3 and cover glass installed on the upper surface are formed integrally. In addition, in FIG. 1, a signal or a display data signal for controlling a gate wiring for display, and a signal or a detection signal for driving a drive electrode for touch detection are shown by wide arrows, a control signal or a timing signal for controlling each circuit operation within an IC is shown by a solid line arrow, and a power supply wiring is not shown. In addition, bus display of a signal line is not shown in the drawing, but each signal line is constituted by one or more analog or digital signal wirings.

The host processor 5 generates display data, and the display driver 20 performs display control for displaying display data received from the host processor 5 on the display panel 2. The host processor 5 acquires data of position coordinates in case that a contact event is generated, from the MPU 30, and analyzes an input based on the operation of the touch panel 3 from a relationship between the data of position coordinates in the display panel 2 and a display screen displayed by giving the data to the display driver 20. Although not particularly limited, a communication control unit, an image processing unit, a sound processing unit, other accelerators, and the like that are not shown can be built into the host processor or connected thereto, to thereby form, for example, a portable terminal.

The touch panel controller 10 within the display driver with a built-in touch panel controller (composite IC) 1 is configured to include a touch detection signal drive circuit (Tx driver) 11, a touch detection signal detection circuit (Rx receiver) 12, a touch detection control unit 13, an A/D converter (ADC) 14, and a memory 15. The touch detection signal drive circuit (Tx driver) 11 drives the Y electrodes Y1 to YM, which are drive electrodes, by applying the touch detection drive signal TOUTx, for example, in the arrangement order. A signal RINx sequentially obtained from the X electrodes X1 to XN, which are detection electrodes in association therewith, is detected and amplified in the Rx receiver 12, converted into a digital value in the ADC 14, and written in the memory 15. The detected digital value is readout in the MPU 30 through the touch detection control unit 13, and the MPU 30 performs a process of detecting a touch state or coordinates from the detection data that is acquired by the touch panel controller 10.

The display driver 20 within the display driver with a built-in touch panel controller (composite IC) 1 is configured to include a system interface 27, a display interface 28, a display control unit 26, a gate control driver 25, a memory 24, a data latch circuit 23, a gradation voltage selection circuit 22, a source driver 21, and a power supply circuit 29. The display driver 20 is connected to the host processor 5 by a system bus through the system interface 27, receives a control command, transmits data including a touch position or a state that is detected by the MPU 30, and transmits and receives various parameters within other ICs. The display driver 20 is connected to the host processor 5 by an interface based on MIPI-DSI (Mobile Industry Processor Interface Display Serial Interface) which is one of, for example, standard communication interfaces of a display device through the display interface 28, receives image data to be displayed on the display panel 2 at high speed, and also receives timing information, such as a vertical synchronizing signal (Vsync) and a horizontal synchronizing signal (Hsync), together.

The display control unit 26 includes a command register (not shown) and a parameter register (not shown) that hold the control command and the parameters that are received from the host processor 5, and controls the operation of each circuit on the basis thereof. In addition, the control command and the parameters that are received from the host processor 5 are transferred to the MPU 30 and the touch panel controller 10, and a relay for transmitting data, such as a touch position or a state from the MPU 30 to the host processor 5, is performed.

The display control unit 26 controls the gate control driver 25 on the basis of the timing information, such as the vertical synchronizing signal (Vsync) and the horizontal synchronizing signal (Hsync) that are received by the display interface 28, and outputs a control signal Gctl that is supplied to the gate-in-panel circuits 80_1 and 80_2 of the display panel 2. The control signal Gctl may include an analog signal or the like for specifying the amplitude of a pulse for driving the gate wirings G1 to Gm, in addition to a clock or a start flag for bringing the shift register into operation. In addition, a drive circuit that outputs a pulse for directly driving the scanning electrode (gate wiring) may be included that is capable of being applied to a display panel that does not include the gate-in-panel circuit.

The display control unit 26 writes image data that is received by the display interface 28 in the memory 24. The memory 24 is an SRAM (Static Random Access Memory), and functions as a frame memory. One line's worth of image data is read out into the data latch 23 from the memory 24. The gradation voltage selection circuit 22 converts one line's worth of image data supplied from the data latch 23 by a digital value, in parallel, into a corresponding analog gradation voltage and supplies the resultant voltage to the source driver 21. The gradation voltage selection circuit 22 selects and outputs one analog gradation voltage, corresponding to the image data having a digital value, from a multi-gradation analog gradation voltage that is generated and supplied by a gradation voltage generation circuit (not shown), or newly generates an intermediate gradation voltage from a plurality of gradation voltages, and supplies the generated voltage to the source driver 21. The source driver 21 performs current amplification on the input gradation voltage, and drives the signal electrode (source wiring) Sn of the display driver 2.

The power supply circuit 29 is configured to include a booster circuit, a step-down circuit, a stabilizing circuit (regulator), and the like, and generates an internal power supply, used in each circuit within the display driver with a built-in touch panel controller (composite IC) 1, from a power supply that is supplied from the outside. The details thereof will be described later.

The above-mentioned display driver 20 has been described with respect to an example configuration in which the frame memory 24 is built in, but can also adopt a configuration in which the frame memory is not built in. In the example configuration in which the frame memory 24 is built in, in case that an image to be displayed is a still image, a still image of one frame is held in the frame memory 24, and repeatedly read out and displayed, whereby it is possible to omit the transfer of image data from the host processor 5 in a period in which the still image is displayed. On the other hand, in the configuration in which the frame memory is not built in, a chip area can be reduced, and thus costs are reduced.

Figure 4:
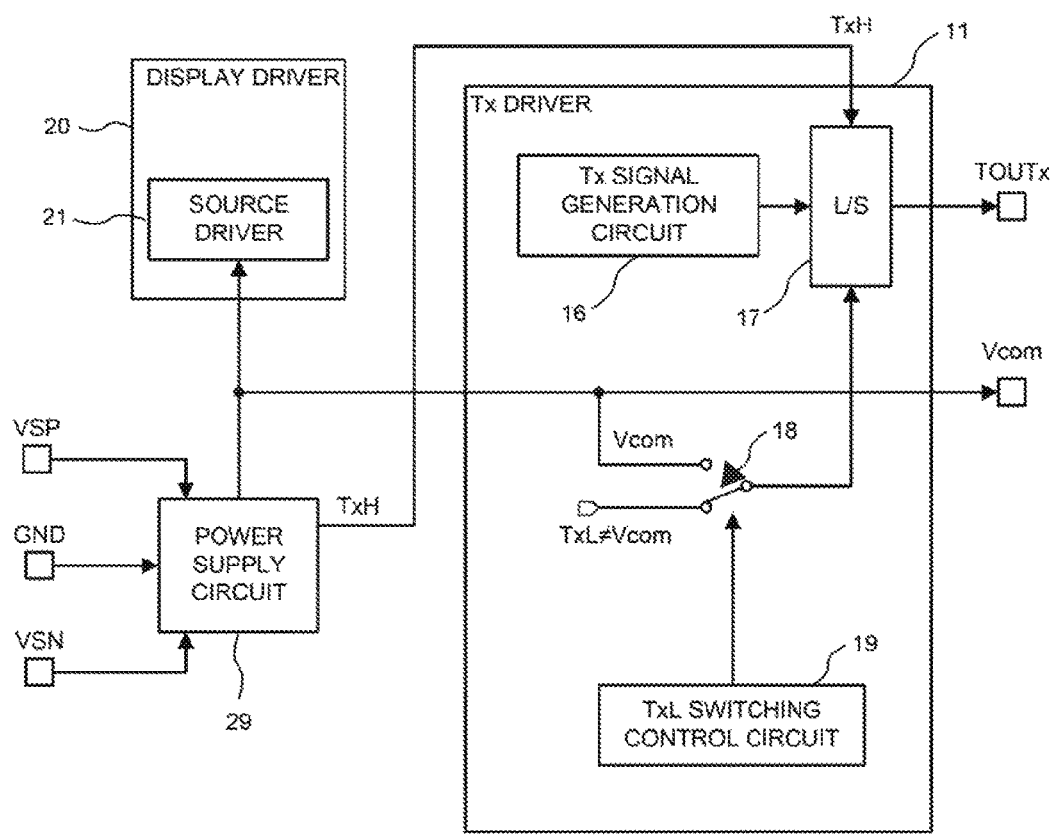
FIG. 4 is a block diagram illustrating an example configuration of a touch detection signal drive circuit (Tx driver) according to embodiments of the invention.

FIG. 4 is a block diagram illustrating a configuration example of the touch detection signal drive circuit (Tx driver) 11 according to embodiments of the invention. The touch detection signal drive circuit (Tx driver) 11 is configured to include a touch detection signal generation circuit (Tx signal generation circuit) 16, a level shifter (L/S), a switch 18, and a TxL switching control circuit 19. A pulse that is generated by the Tx signal generation circuit 16 is subjected to amplitude adjustment by the level shifter (L/S), and is output as a touch detection signal TOUTx. A power supply TxH on the high potential side is supplied to the high potential side of the level shifter (L/S) from the power supply circuit 29, and switching control is performed so that the common voltage Vcom or other voltages are applied to the low potential side thereof by the switch 18, which is controlled by the TxL switching control circuit 19. The common voltage Vcom is a power supply that is generated by the power supply circuit 29 and is supplied to the source driver 21 within the display driver 20 as a common voltage in case that the signal electrode (source wiring) Sn of the display driver 2 is driven, and is also a common power supply of each pixel capacitor C of the display panel 2.

The TxL switching control circuit 19 supplies the common voltage Vcom to the low potential side of the level shifter (L/S) through the switch 18 in case that the composite panel 4 composed of the display panel 2 and the touch panel 3 is an in-cell type, and supplies voltage levels other than Vcom in case that the composite panel is an on-cell type. Based on the operation of the level shifter (L/S), the touch detection signal TOUTx is set to a pulse having an amplitude between the common voltage Vcom and TxH in the case of the in-cell type, and is set to a pulse having an amplitude between the voltage level other than the common voltage Vcom and TxH in the case of the on-cell type.

Thereby, in a semiconductor device (IC), having a display driver and a touch panel controller integrated into the same chip, which is capable of being applied to the display and touch panel device of either the in-cell type or the on-cell type, even in the case of connection to the display and touch panel (composite panel) of the on-cell type, it is possible to prevent exogenous noise from being mixed into the common voltage (Vcom). This is because the routing of the common voltage (Vcom) in the case of connection to the composite panel of the on-cell type does not become remarkably longer than in the case of connection to the composite panel of the in-cell type.

The specification of whether the composite panel 4 to be connected is an in-cell type or an on-cell type can be performed by various methods. For example, the display driver with a built-in touch panel controller (composite IC) 1 may include a terminal for specifying whether the composite panel to be connected is an in-cell type or an on-cell type. The type of the panel to be connected is specified by pulling up or pulling down this terminal at the outside. Thereby, it is possible to easily set whether the composite panel to be connected is an in-cell type or an on-cell type. In addition, a panel type specification register for specifying whether the composite panel 4 to be connected is an in-cell type or an on-cell type may be added to a parameter register (not shown) that is built into the display control unit 26, which results in a configuration in which writing can be performed by the host processor 5 through the system interface 27. Thereby, it is possible to easily set whether the composite panel 4 to be connected is an in-cell type or an on-cell type from the external host processor 5. In this case, the initial value of the panel type specification register at the time of power-on may be set to a value for specifying that the composite panel 4 to be connected is an in-cell type. This is because, even in case that the composite panel 4 to be connected is an in-cell type and has a low withstanding voltage, an accident of the touch detection signal TOUTx having a large amplitude being applied by mistake before register setting can be prevented from occurring.

[Second Embodiment]

The voltage level other than the common voltage Vcom can be supplied by various methods. For example, the voltage level may be supplied by generating a power supply having a new voltage level from a power supply that is supplied from outside of the display driver with a built-in touch panel controller (composite IC) 1, various internal power supplies that are generated by the power supply circuit 29, or the power supplies described below.

Figure 5:
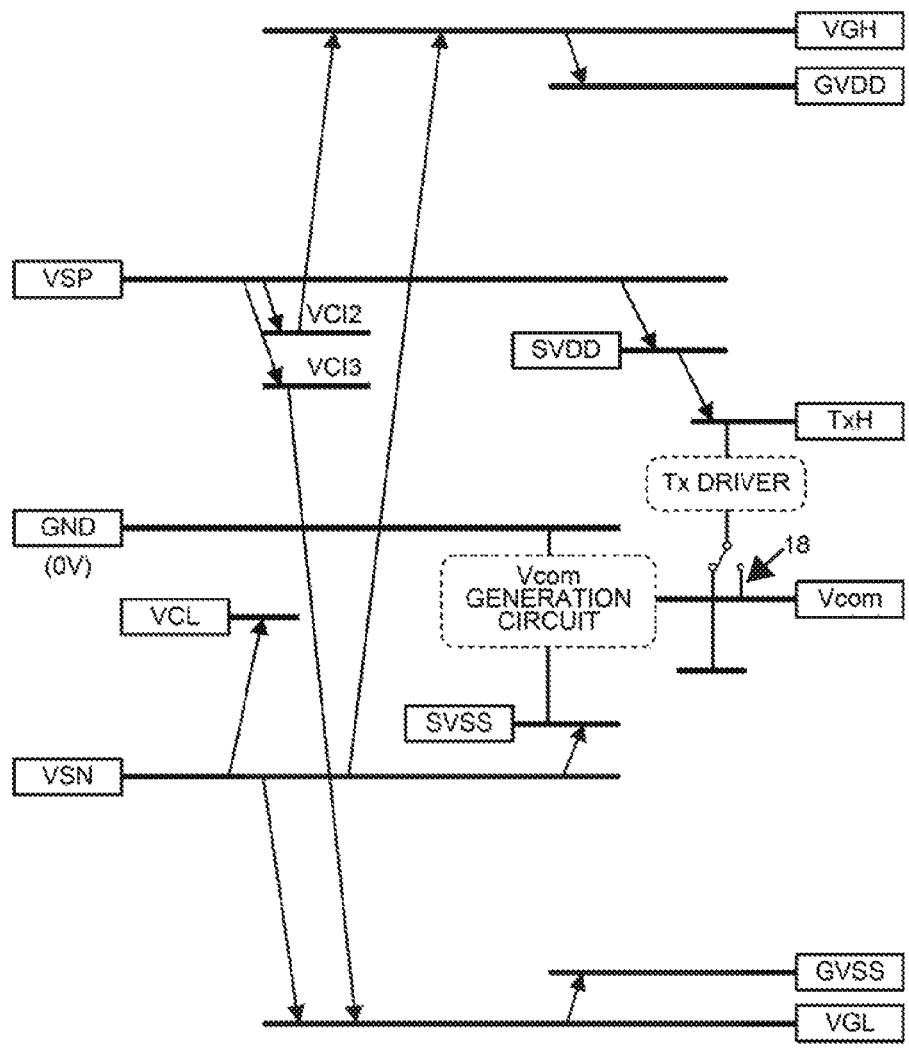
FIG. 5 is a diagram illustrating embodiments of various internal power supplies that are generated by a power supply circuit of the display driver with a built-in touch panel controller (composite IC).

FIG. 5 is a diagram illustrating examples of various internal power supplies that are generated by the power supply circuit 29 of the display driver with a built-in touch panel controller (composite IC) 1. The power supply circuit 29 is configured to include a booster circuit, a step-down circuit, a stabilizing circuit (regulator), and the like, and generates an internal power supply used in each circuit within the display driver with a built-in touch panel controller (composite IC) 1, from power supplies VSP and VSN of the positive electrode and the negative electrode, which are supplied from the outside with respect to a ground potential GND (0 V). The external power supplies VSP and VSN are set to, for example, ±5 V. The power supply circuit 29 generates an internal reference power supply (VCL) on the negative electrode side from the external power supply VSN on the negative electrode side. This power supply is set to, for example, −3 V. The power supply circuit 29 generates separate internal reference power supplies VCI2 and VCI3, supplies the generated power supplies to the booster circuit to generate internal boosting power supplies VGH and VGL of the positive electrode and the negative electrode, stabilizes each of the power supplies using the regulator, and generates power supplies GVDD and GVSS of the positive electrode and the negative electrode, which are supplied to the gate-in-panel circuit 80 of the display panel 2. In addition, the power supply circuit 29 generates SVDD and SVSS, respectively, from VSP and VSN, which are supplied from the outside. The power supply TxH on the high potential side, which is supplied to the touch detection signal drive circuit (Tx driver) 11, is generated from SVDD, and the common voltage Vcom that is supplied to the display panel 2 is generated from SVSS by a Vcom generation circuit.

Figure 6:
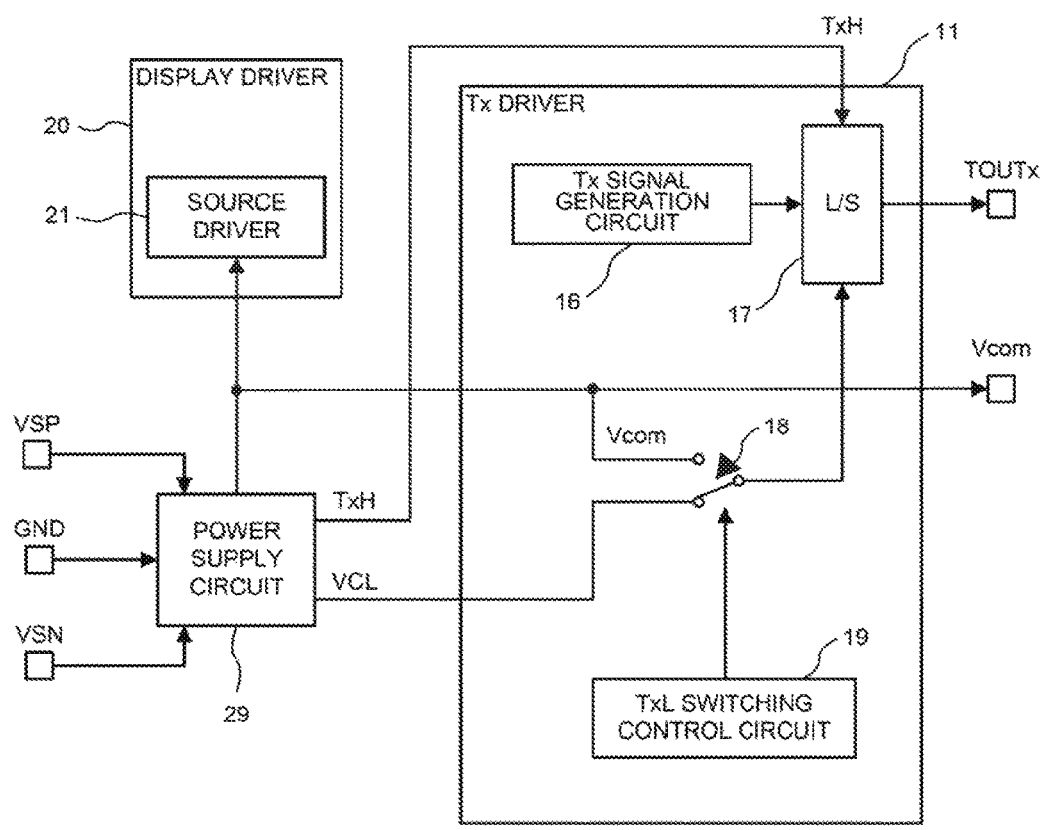
FIG. 6 is a block diagram illustrating an example configuration of the touch detection signal drive circuit (Tx driver) in which an internal reference power supply (VCL) on the negative electrode side that is generated by the power supply circuit is supplied as a voltage level other than a common voltage (Vcom).

FIG. 6 is a block diagram illustrating an example configuration of the touch detection signal drive circuit (Tx driver) in which the internal reference power supply (VCL) on the negative electrode side that is generated by the power supply circuit 29 is supplied as a voltage level other than the common voltage (Vcom).

The touch detection signal drive circuit (Tx driver) 11 supplies the common voltage Vcom to the low potential side of the level shifter (L/S) through the switch 18 using the TxL switching control circuit 19 in case that the composite panel 4 is an in-cell type, and supplies the internal reference power supply (VCL) on the negative electrode side, which is generated by the power supply circuit 29 as the voltage level other than Vcom in case that the composite panel is an on-cell type. Based on the operation of the level shifter (L/S), the touch detection signal TOUTx is set to a pulse having an amplitude between the common voltage Vcom and TxH in the case of the in-cell type, and is set to a pulse having an amplitude between VCL and TxH in the case of the on-cell type.

Thereby, in case that the composite panel 4 is an on-cell type, the internal reference power supply (VCL) on the negative electrode side is used instead of the common voltage (Vcom). Generally, since VCL is set to, for example, −3 V, and is set to have substantially the same voltage level as that of Vcom, which is set to −3 V to 0 V, it is possible to omit switching control for enabling other circuits within the touch panel controller 10 to be applied to both the in-cell type and the on-cell type, for example, control for switching a power supply that is supplied to a protective diode of the output terminal of the Tx driver 11, and the like. Since VCL has a voltage level close to that of Vcom, but is an individual power supply, the mutual propagation of noise is kept low. In the case of the on-cell type, exogenous noise, which is mixed into the low voltage power supply VCL by routing the touch detection signal TOUTx, can be suppressed and not propagated to Vcom.

Figure 7:
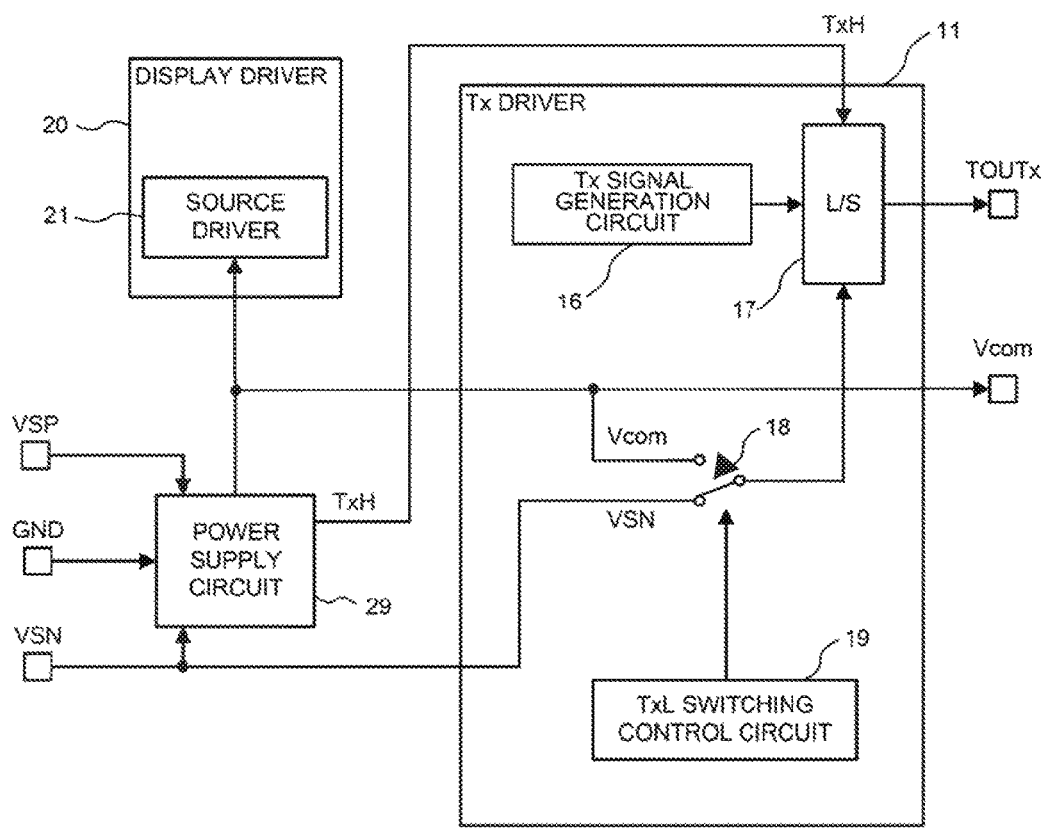
FIG. 7 is a block diagram illustrating an example configuration of the touch detection signal drive circuit (Tx driver) in which a power supply (VSN) that is supplied from the outside is supplied as a voltage level other than the common voltage (Vcom).

FIG. 7 is a block diagram illustrating an example configuration of the touch detection signal drive circuit (Tx driver) in which the power supply (VSN) that is supplied from the outside is supplied as the voltage level other than the common voltage (Vcom). VSN on the negative electrode side of the external power supplies VSP and VSN, which are supplied from the outside to the power supply circuit 29, is supplied to the touch detection signal drive circuit (Tx driver) 11 as the voltage level other than the common voltage (Vcom). Other configurations are the same as in FIG. 6, and thus the description thereof will not be given.

Thereby, in case that the composite panel 4 is an on-cell type, the external power supply (VSN) on the negative electrode side is used instead of the common voltage (Vcom). By not going through the internal power supply circuit 29, it is possible to reduce exogenous noise that is mixed into the touch detection signal TOUTx being mixed into a circuit on the display driver 20 side through the power supply circuit 29.

Figure 8:
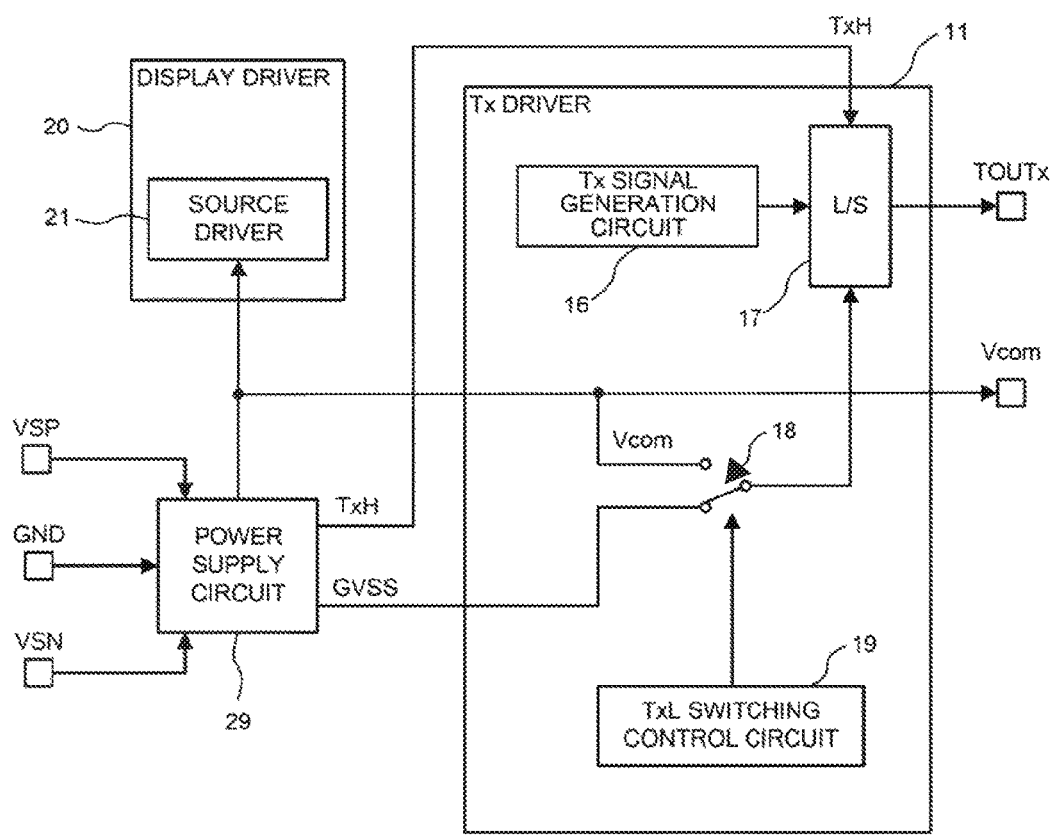
FIG. 8 is a block diagram illustrating an example configuration of the touch detection signal drive circuit (Tx driver) in which a gate drive power supply (GVSS) on the negative electrode side that is generated by the power supply circuit is supplied as a voltage level other than the common voltage (Vcom).

FIG. 8 is a block diagram illustrating an example configuration of the touch detection signal drive circuit (Tx driver) 11 in which the gate drive power supply (GVSS) on the negative electrode side that is generated by the power supply circuit is supplied as the voltage level other than the common voltage (Vcom). The power supply circuit 29 generates the gate drive power supplies (GVDD and GVSS) on the positive electrode side and the negative electrode side, and supplies the generated power supplies to the gate control driver 25. The gate drive power supply (GVSS) on the negative electrode side of these gate drive power supplies is supplied to the touch detection signal drive circuit (Tx driver) 11 as the voltage level other than the common voltage (Vcom). Other configurations are the same as in FIG. 6, and thus the description thereof will not be given.

Thereby, in case that the composite panel 4 is an on-cell type, the gate drive power supply (VGSS) that drives the gate control circuit (gate-in-panel circuit) 80 of the display panel 2 is used instead of the common voltage (Vcom). Generally, VGSS is set to approximately −11 V, and is stabilized and generated after an external power supply is once boosted by the power supply circuit 29, and thus has little influence on noise. In addition, the touch detection signal TOUTx preferably has a large amplitude in order to improve the sensitivity of touch detection. However, in the case of the in-cell type, a withstanding voltage is restricted on the structure, and is generally less than 10 V in many cases. Therefore, the touch detection signal TOUTx is appropriately suppressed to an amplitude that does not exceed the above withstanding voltage as a Vcom reference. On the other hand, in the case of the on-cell type, the withstanding voltage is generally equal to or greater than 15 V, and thus it is not necessary to keep the amplitude of the touch detection signal TOUTx small in accordance with the in-cell type. With such a configuration as shown in FIG. 8, the amplitude of the touch detection signal TOUTx can be appropriately switched on the basis of whether the composite panel 4 to be connected is an in-cell type or an on-cell type.

Figure 9:
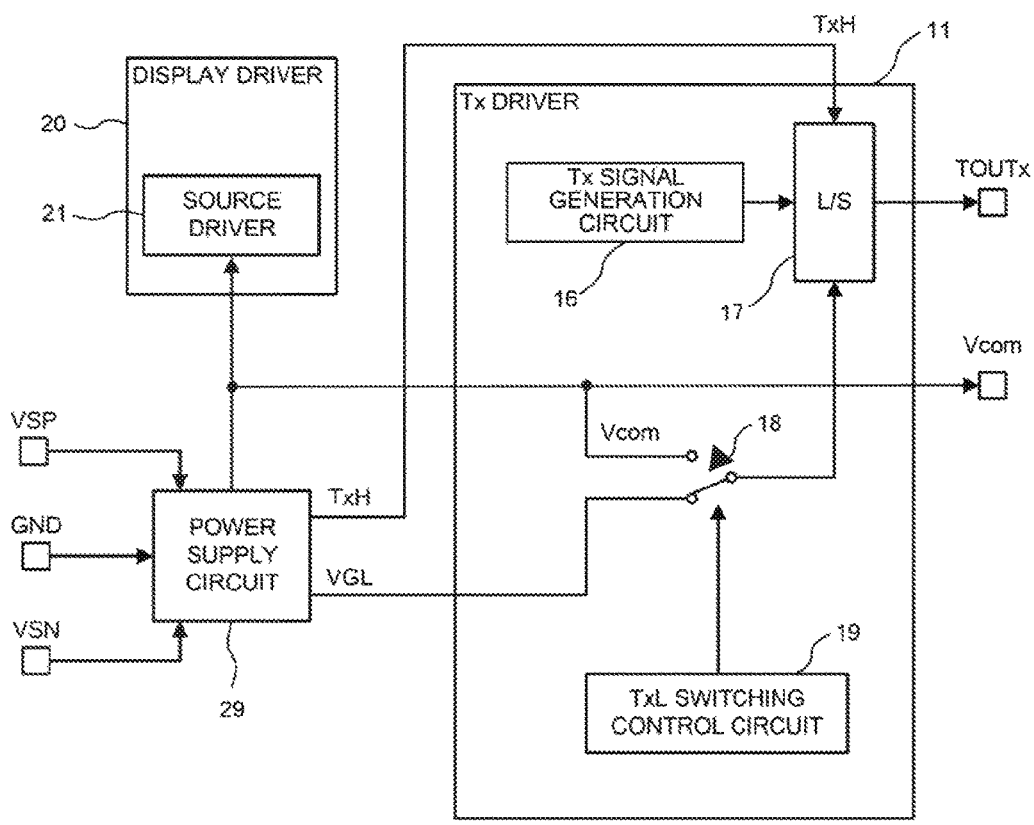
FIG. 9 is a block diagram illustrating an example configuration of the touch detection signal drive circuit (Tx driver) in which a boosting power supply (VGL) on the negative electrode side that is generated for the gate drive power supply by the power supply circuit is supplied as a voltage level other than the common voltage (Vcom).

FIG. 9 is a block diagram illustrating an example configuration of the touch detection signal drive circuit (Tx driver) in which the boosting power supply (VGL) on the negative electrode side that is generated for the gate drive power supply by the power supply circuit is supplied as a voltage level other than the common voltage (Vcom). As described above, the power supply circuit 29 once generates the boosting power supplies VGH and VGL in order to generate the gate drive power supplies (GVDD and GVSS) stabilized by the regulator. The boosting power supply (VGL) on the negative electrode side of these boosting power supplies is supplied to the touch detection signal drive circuit (Tx driver) 11 as the voltage level other than the common voltage (Vcom). Other configurations are the same as in FIG. 6, and thus the description thereof will not be given.

Thereby, in case that the composite panel 4 is an on-cell type, the boosting power supply (VGL) that is internally boosted in order to generate the gate drive power supply (VGSS) is used instead of the common voltage (Vcom). As is the case with FIG. 8, it is possible to appropriately switch the amplitude of the touch detection signal TOUTx on the basis of whether the composite panel 4 to be connected is an in-cell type or an on-cell type, and to make the amplitude larger than in the case of FIG. 8.

Figure 10:
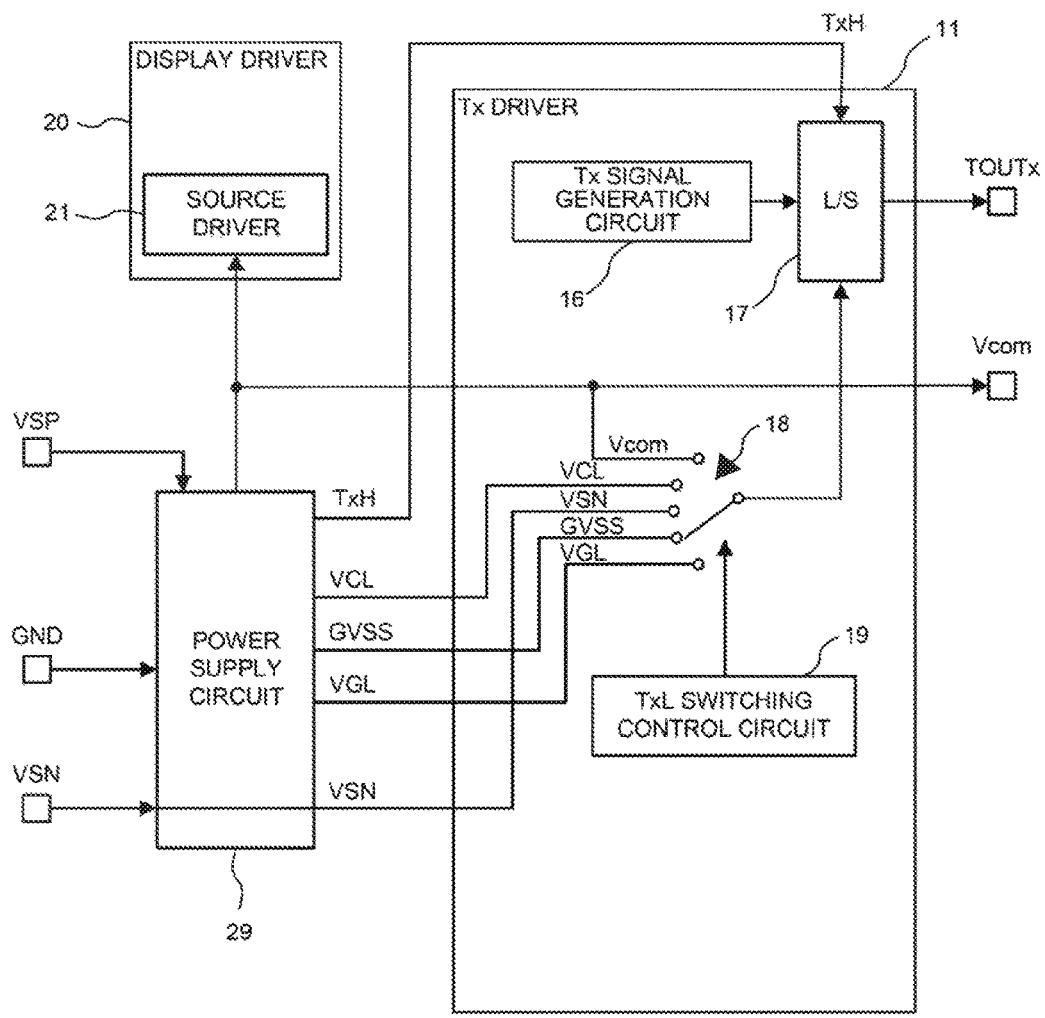
FIG. 10 is a block diagram illustrating an example configuration of the touch detection signal drive circuit (Ix driver) capable of selecting a power supply that is supplied as a voltage level other than the common voltage (Vcom).

FIG. 10 is a block diagram illustrating an example configuration of the touch detection signal drive circuit (Tx driver) capable of selecting a power supply that is supplied as a voltage level other than the common voltage (Vcom). In case that the composite panel 4 is an on-cell type, the touch detection signal drive circuit (Tx driver) 11 selects one power supply from the external power supply VSN, and various internal power supplies that are generated from the power supply circuit 29, as the voltage level other than the common voltage (Vcom), and outputs the touch detection signal TOUTx having an amplitude between the selected voltage and TxH to the touch panel 3. For example, as shown in FIG. 10, one voltage is selected by the switch 18 from the internal reference power supply VCL on the negative electrode side, the external power supply VSN, the gate drive power supply GVSS, and the internal boosting power supply (negative electrode side) VGL for generating these power supplies, as the common voltage (Vcom) or other voltages, and is supplied to the touch detection signal drive circuit (Tx driver) 11. Other configurations are the same as in FIG. 6, and thus the description thereof will not be given.

Thereby, a power supply required for the touch detection signal drive circuit can be selected from various internal power supplies that are generated inside the semiconductor device (IC).

Figure 11:
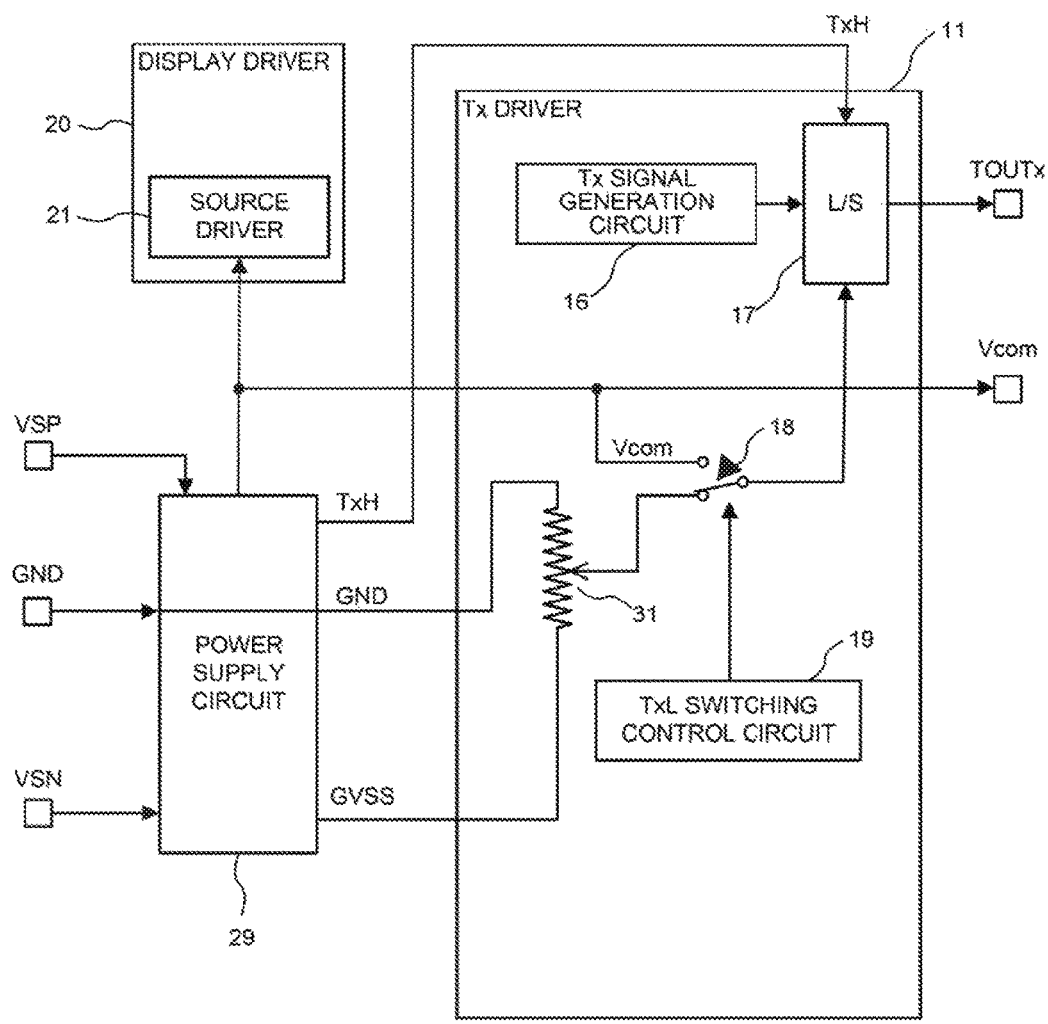
FIG. 11 is a circuit diagram illustrating an example configuration of the touch detection signal drive circuit (Tx driver) capable of freely setting a power supply that is supplied as a voltage level other than the common voltage (Vcom).

FIG. 11 is a circuit diagram illustrating an example configuration of the touch detection signal drive circuit (Tx driver) capable of freely setting a power supply that is supplied as a voltage level other than the common voltage (Vcom).

The touch detection signal drive circuit (Tx driver) 11 includes a variable power supply circuit 31 that makes a generated voltage variable. The variable power supply circuit 31 is configured using, for example, a resistor ladder 31. The high potential end of the resistor ladder 31 is connected to a ground level GND, and the low potential end thereof is connected to the gate drive power supply GVSS. Any voltage is selected from a center tap and is supplied to the switch 18. Other configurations are the same as in FIG. 6, and thus the description thereof will not be given.

The touch detection signal drive circuit (Tx driver) 11 can supply the common voltage Vcom to the low potential side of the level shifter (L/S) through the switch 18 using the TxL switching control circuit 19 in case that the composite panel 4 is an in-cell type, and can supply any voltage that is generated by the variable power supply circuit 31 as the voltage level other than Vcom in case that the composite panel is an on-cell type. Based on the operation of the level shifter (L/S), the touch detection signal TOUTx is set to a pulse having an amplitude between the common voltage Vcom and TxH in the case of the in-cell type, and is set to a pulse having an amplitude between the voltage level other than the common voltage Vcom and TxH in the case of the on-cell type.

Thereby, it is possible to freely determine the amplitude level on the low voltage side of the touch detection signal in the case of the on-cell type.

As stated above, while embodiments of the invention have been described specifically above, the invention is not limited to the embodiments, and various changes and modifications may be made without departing from the scope of the invention.

For example, a case has been described in which the display driver with a built-in touch panel controller (composite IC) 1 is mainly connected to a liquid crystal display panel, but the display driver can be changed to a composite IC 1 for driving an OLED. In addition, in the detailed example configuration of the composite IC 1 shown in FIG. 1, an example configuration in which the frame memory 24 is built in is shown, but an appropriate change can be made not only in a simple configuration in which the frame memory is not included, but also in a highly-functional configuration further including other functions.

What is claimed is:

1. A semiconductor device configured for connection to a composite panel having a display panel and a touch panel laminated therein, comprising:
    a display signal drive circuit; and
    a touch detection signal drive circuit,
    wherein the display signal drive circuit is configured to output a display signal having a signal level based on a common voltage to the display panel, and the touch detection signal drive circuit is configured to output a touch detection signal to the touch panel,
    wherein the display signal drive circuit comprises a switch configured to make the touch detection signal have a signal level based on the common voltage in case that the composite panel is an in-cell type, and configured to make the touch detection signal have a signal level based on a voltage level other than the common voltage in case that the composite panel is an on-cell type.

2. The semiconductor device according to claim 1, further comprising a variable power supply circuit configured to generate a variable voltage,
    wherein in case that the composite panel is an on-cell type, the touch detection signal drive circuit is configured to output a touch detection signal having a signal level based on the variable voltage generated by the variable power supply circuit, to the touch panel, as the voltage level other than the common voltage.

3. The semiconductor device according to claim 1, further comprising a terminal for specifying whether the composite panel to be connected is an in-cell type or an on-cell type.

4. The semiconductor device according to claim 1, further comprising a power supply circuit configured to generate a plurality of internal power supplies including the first power supply for supplying the common voltage, on the basis of an external power supply,
    wherein in case that the composite panel is an on-cell type, the touch detection signal drive circuit is configured to select one power supply from the external power supply and the one or more internal power supplies that are generated from the power supply circuit, as the voltage level other than the common voltage, and outputs a touch detection signal having a signal level based on the selected power supply to the touch panel.

5. The semiconductor device according to claim 4, further comprising a gate control driver configured to drive a gate control circuit of the display panel,
    wherein the power supply circuit generates a plurality of internal power supplies including the first power supply for supplying the common voltage, on the basis of an external power supply on the positive electrode side and an external power supply on the negative electrode side,
    the power supply circuit includes a booster circuit configured to boost each of the external power supplies on the positive electrode side and the negative electrode side, and a stabilizing circuit configured to stabilize an output of the booster circuit, the power supply circuit configured to generate gate drive power supplies on the positive electrode side and the negative electrode side using the booster circuit and the stabilizing circuit to supply the generated gate drive power supplies to the gate control driver, and
    the plurality of internal power supplies include an internal reference power supply on the negative electrode side, an output of the booster circuit, and the gate drive power supply.

6. The semiconductor device according to claim 1, further comprising a system interface for connection to a host processor and a register for specifying whether the composite panel to be connected is an in-cell type or an on-cell type,
    wherein the register is writably configured by the host processor through the system interface.

7. The semiconductor device according to claim 6, wherein an initial value of the register at the time of power-on is set to a value for specifying that the composite panel to be connected is an in-cell type.

8. The semiconductor device according to claim 1, further comprising a power supply circuit configured to generate a first power supply for supplying the common voltage and a second power supply having the voltage level other than the common voltage, on the basis of an external power supply on a positive electrode side and an external power supply on a negative electrode side.

9. The semiconductor device according to claim 8, wherein the power supply circuit generates an internal reference power supply on the negative electrode side, and supplies the generated internal reference power supply to the touch detection signal drive circuit, as the second power supply having the voltage level other than the common voltage.

10. The semiconductor device according to claim 8, wherein the external power supply on the negative electrode side is supplied to the touch detection signal drive circuit, as the second power supply having the voltage level other than the common voltage.

11. The semiconductor device according to claim 8, further comprising a gate control driver configured to drive a gate control circuit of the display panel,
   wherein the power supply circuit is configured to generate gate drive power supplies on the positive electrode side and the negative electrode side to supply the generated gate drive power supplies to the gate control driver, and supplies the gate drive power supply on the negative electrode side to the touch detection signal drive circuit, as the second power supply having the voltage level other than the common voltage.

12. The semiconductor device according to claim 8, further comprising a gate control driver configured to drive a gate control circuit of the display panel,
   wherein the power supply circuit includes a booster circuit configured to boost each of the external power supplies on the positive electrode side and the negative electrode side, and a stabilizing circuit configured to stabilize an output of the booster circuit, the power supply circuit configured to generate gate drive power supplies on the positive electrode side and the negative electrode side using the booster circuit and the stabilizing circuit to supply the generated gate drive power supplies to the gate control driver, and
   the power supply circuit is configured to supply an output power supply of the booster circuit on the negative electrode side to the touch detection signal drive circuit, as the second power supply having the voltage level of the common voltage.

* * * * *